(12) United States Patent
Guim Bernat et al.

(10) Patent No.: US 11,079,955 B2
(45) Date of Patent: Aug. 3, 2021

(54) CONCEPT FOR APPROXIMATE DEDUPLICATION IN STORAGE AND MEMORY

(71) Applicant: Intel Corporation, Santa Clara, CA (US)

(72) Inventors: Francesc Guim Bernat, Barcelona (ES); Karthik Kumar, Chandler, AZ (US); Mustafa Hajeer, Hillsboro, OR (US); Thomas Willhalm, Sandhausen (DE); Amin Firoozshahian, Mountain View, CA (US); Chandan Egbert, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/221,832

(22) Filed: Dec. 17, 2018

(65) Prior Publication Data

US 2019/0121564 A1    Apr. 25, 2019

(51) Int. Cl.
*G06F 3/06* (2006.01)

(52) U.S. Cl.
CPC .......... *G06F 3/0641* (2013.01); *G06F 3/0608* (2013.01); *G06F 3/0619* (2013.01); *G06F 3/0671* (2013.01); *G06F 3/0679* (2013.01)

(58) Field of Classification Search
CPC .... G06F 3/0608; G06F 3/0619; G06F 3/0641; G06F 3/0679; G06F 3/0671
See application file for complete search history.

(56) References Cited

U.S. PATENT DOCUMENTS

| | | | | |
|---|---|---|---|---|
| 9,141,554 B1* | 9/2015 | Candelaria | .......... | H03M 7/3091 |
| 2014/0149656 A1 | 5/2014 | Cheriton | | |
| 2016/0350324 A1* | 12/2016 | Wang | .................. | G06F 16/2255 |
| 2016/0357743 A1* | 12/2016 | Swaminathan | ..... | G06F 16/2255 |
| 2017/0039211 A1* | 2/2017 | Pottinger | .............. | G06F 16/152 |
| 2017/0344579 A1* | 11/2017 | Basireddy | ............. | G06F 16/174 |
| 2018/0060037 A1* | 3/2018 | Johnson | .................... | G06F 7/08 |

OTHER PUBLICATIONS

Dong, Siying et al.; "Optimizing Space Amplification in RocksDB"; CIDR vol. 3, 2017.

* cited by examiner

*Primary Examiner* — Jane Wei
(74) *Attorney, Agent, or Firm* — 2SPL Patent Attorneys PartG mbB; Kieran O'Leary

(57) ABSTRACT

Examples relate to an approximative memory deduplication method, a controller apparatus or controller device for a memory or storage controller, a memory or storage controller, a computer system and to a computer program. The approximative memory deduplication method comprises determining a hash value of a data block. The hash value is based on a user-defined approximative hashing function. The approximative memory deduplication method comprises storing a quantized version of the data block based on the hash value using a memory or storage device of the computer system.

18 Claims, 10 Drawing Sheets

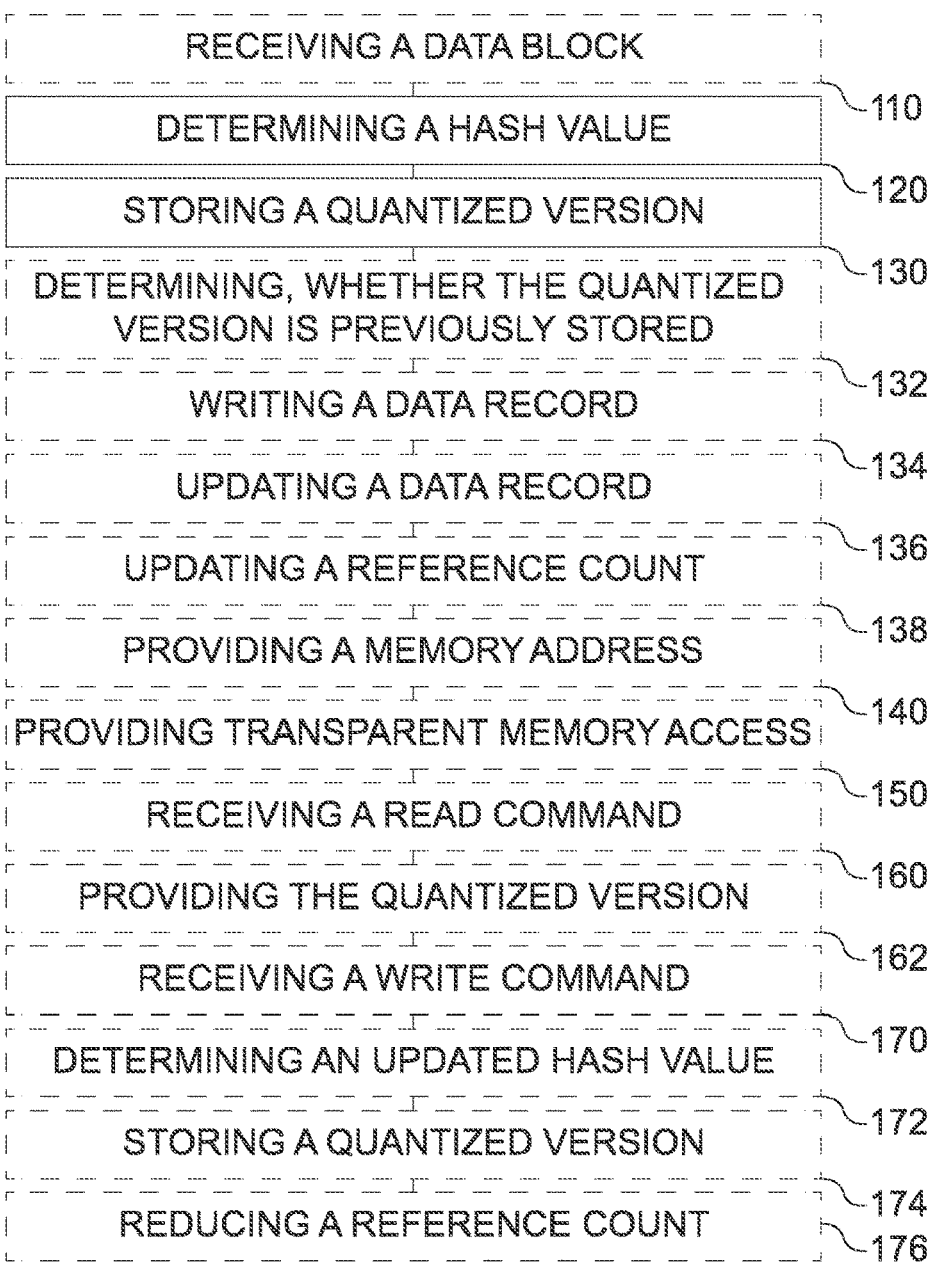

| 212 | 214 |
|---|---|
| cats | x00 |
| dogs | x01 |
| 1234 | .. |
| mice | .. |
| mice | |
| 1234 | |
| 6789 | |
| 0000 | |
| 0000 | |
| dogs | |
| 1234 | .. |
| 0000 | x0B |

| 216 | 218 | 214 |
|---|---|---|
| | | x00 |
| | | x01 |
| dogs | 2 | .. |
| 1234 | 3 | .. |
| | | |
| cats | 1 | |
| 6789 | 1 | |
| | | |
| mice | 2 | |
| | | |
| | | .. |
| 0000 | 3 | x0B |

Fig. 2a

CONCEPT FOR APPROXIMATE DEDUPLICATION IN STORAGE AND MEMORY

FIELD

Examples relate to an approximative memory deduplication method, a controller apparatus or controller device for a memory or storage controller, a memory or storage controller, a computer system and to a computer program.

BACKGROUND

Memory and storage systems are often used to intermittently or persistently store data within a computer system. This data may originate from a multitude of sources, e.g. generated within a computer system or received from an entity outside the computer system. The efficient organization of the data stored within such memory and storage systems is a field or research and development.

BRIEF DESCRIPTION OF THE FIGURES

Some examples of apparatuses and/or methods will be described in the following by way of example only, and with reference to the accompanying figures, in which FIGS. 1a and 1b show flow charts of examples of an approximative memory deduplication method for a computer system;

FIG. 2a shows a schematic diagram of two exemplary columns of memory;

DETAILED DESCRIPTION

Figure 1C:
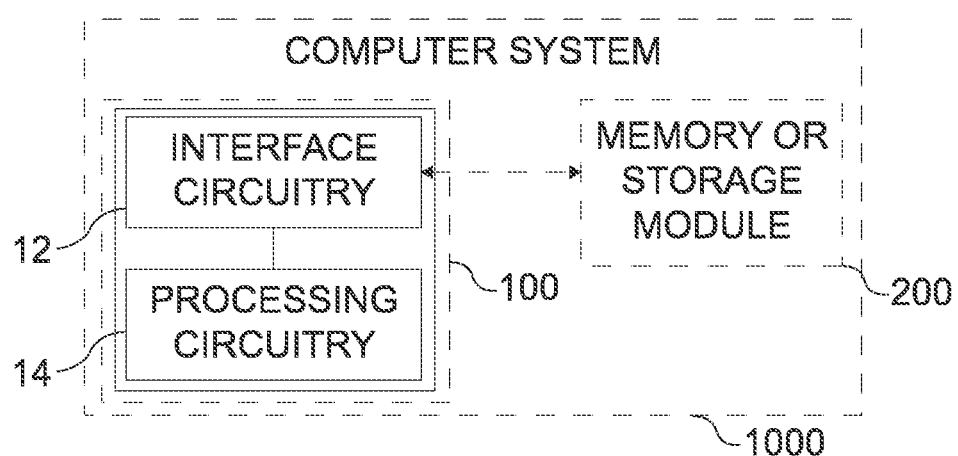
FIG. 1c shows a block diagram of a controller apparatus or controller device for a memory or storage controller of a computer system.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIGS. 1a and 1b show flow charts of examples of an approximative memory deduplication method for a computer system 1000. The method comprises determining 120 a hash value of a data block. The hash value is based on a user-defined approximative hashing function. The method further comprises storing 130 a quantized version of the data block based on the hash value using a memory or storage device 200 of the computer system 1000. The approximative memory deduplication method may be implemented by a circuitry of the computer system 1000. For example, the approximative memory deduplication method may be executed by a memory or storage controller 100 of the computer system 1000.

FIG. 1c shows a block diagram of a (corresponding) controller apparatus 10 or controller device 10 for the memory or storage controller 100 of the computer system 1000. The described controller apparatus 10 corresponds to the controller device 10. The components of the controller device 10 are defined as component means, which correspond to the respective structural components of the controller apparatus 10. The controller apparatus 10 comprises interface circuitry 12, suitable for communicating with the memory or storage device 200 of the computer system 1000. The controller device 10 comprises a means for communicating 12, suitable for communicating with the memory or storage device 200 of the computer system 1000. The controller apparatus 10 comprises processing circuitry 14 configured to determine a hash value of a data block, wherein the hash value is based on a user-defined approximative hashing function, and to store a quantized version of the data block using the memory or storage device 200 based on the hash value. Correspondingly, the controller device 10 comprises a means for processing 14 configured for determining a hash value of a data block, wherein the hash value is based on a user-defined approximative hashing function, and for storing a quantized version of the data block using the memory or storage device 200 based on the hash value.

The interface circuitry/means for communicating 12 is coupled to the processing circuitry/means for processing 14. In at least some examples, the processing circuitry/the means for processing is configured to execute the method of FIG. 1a, e.g. in conjunction with the interface circuitry/means for communicating 12. FIG. 1c further shows the memory or storage controller 100, comprising the controller apparatus 10 or controller device 10. FIG. 1c further shows the computer system 1000, comprising the memory or storage controller 100 and the memory or storage device 200.

The following description may relate to both the approximative memory deduplication method and to the (corresponding) controller apparatus 10 or controller device 10.

Sensors and other IoT devices may generate data that is similar but often not identical. Although the generated data might not be identical, the small differences distinguishing the generated data might mean nothing to the user, but may prevent the data from being compacted. Therefore, data blocks comprising the data may be hashed using a user-defined approximative hash function, which may output the same hash value for similar data blocks. The approximative hash function is user-defined, so the user of the computer system is enabled to specify a desired granularity of the hash function.

The method comprises determining 120 the hash value of the data block. For example, the data block may be a block of data to be stored within a memory unit of the memory or storage device 200. For example, a maximal size of the data block may be based on a block size of the memory or storage device. In at least some examples, the data block may comprise numerical data, e.g. a floating-point number or an integer. For example, the data block may comprise sensor data, e.g. numerical sensor data. Alternatively, the data block may comprise non-numerical content. For example, the non-numerical content may comprise one of a finite number of non-numerical alternatives for the data block.

The hash value is based on a user-defined approximative hashing function. In at least some examples, the user-defined approximative hashing function is a hashing function that determines the hash value of the data block based on the quantized version of the data block. Quantization is the process of constraining an input from a continuous or otherwise large set of values to a discrete set of values. In other words, the quantized version of the data block is a version of the data block with a reduced number of possible values compared to the (original) data block. For example, the quantized version of the data block may have a lower precision or lower resolution than the data block. If, for example, the data block comprises a numerical value, the quantized version of the data block may comprise a rounded version of the numerical value, which may be similar or identical to the numerical value of the data block. This may enable storing the same quantized version of the data block for a plurality of slightly different data blocks. For example, a numerical value of the quantized version of the data block may be at most 5% (or at most 2%, at most 1%, at most 0.5%, at most 0.2%, at most 0.1%) higher or lower than the numerical value of the data block.

In at least some examples, the user-defined hashing function comprises two components: A quantization component for transforming the data block into the quantized version of the data block, and a hash component suitable for mapping the quantized version of the data block to the hash value. The quantization component may specify, which (similar) data blocks result in the same hash value. The user-defined approximative hashing function, e.g. the quantization component of the user-defined approximative hashing function, may be suitable for data quantization of content of the data block. The method may further comprise determining the quantized version of the data block based on the user-defined approximative hashing function, e.g. based on the quantization component of the user-defined approximative hashing function. The data block may be discarded after storing of the quantized version of the data block. This may enable de-duplication of the data block for data blocks with similar, but not identical content. The quantization component may be user-defined. For example, the user-defined approximative hashing function, e.g. the quantization component of the user-defined approximative hashing function, may define a user-desired precision for the quantized version of the data block. This may enable the user to specify, which similar data blocks he or she considers similar enough to be represented by the same quantized version. The user-defined approximative hashing function may be used-defined in so far as the granularity and/or precision of the quantization component of the user-defined approximative hashing function is user-adjustable or user-defined.

In at least some examples, the user-defined approximative hashing function is specific to a content type of the data block. This may enable a user to specify the user-defined approximative hashing function such that the quantized version of the data block is determined with no or little impact to entropy from a standpoint of the user. For example, the user-defined approximative hashing function, e.g. the quantization component of the user-defined approximative hashing function, may be specific to numerical or non-numerical data. In some examples, the user-defined approximative hashing function may be specific to a type of sensor data comprised in the data block. In some examples, the user-defined approximative hashing function, e.g. the quantization component of the user-defined approximative hashing function, is suitable for assigning the data block to a bucket of a plurality of possible buckets. The user-defined approximative hashing function may comprise a mapping instruction for mapping the data block to the quantized version of the data block and for mapping the data block to the hash value. For example, the quantization component may comprise a mapping instruction for mapping the data block to the quantized version of the data block. The hash component may comprise a mapping instruction for mapping the data block or the quantized version of the data block to the hash value. This may enable a non-linear quantization of numerical data and/or a quantization of non-numerical data. For example, the quantized version of the data block corresponds to a value representing a bucket of the plurality of possible buckets. The user-defined approximative hashing function may be suitable for assigning the data block to a bucket of the plurality of possible buckets based on the non-numerical content. For example, the quantization component of the user-defined approximative hashing function may specify a mapping between the numerical or non-numerical content of the data block and the plurality of possible buckets.

The method comprises storing 130 a quantized version of the data block based on the hash value using a memory or storage device 200 of the computer system 1000. In at least some examples, if a new data block is to be written, there are two options: 1) The quantized version of the data block is previously stored within the memory or storage device 200 or 2) The quantized version of the data block is not previously stored within the memory or storage device 200. If the quantized version of the data block is not previously stored within the memory or storage device, the storing 130 of the quantized version may comprise writing the quantized version of the data block within the memory or storage device 200. If the quantized version of the data block is previously stored within the memory or storage device, the storing 130 of the quantized version may comprise updating the quantized version of the data block within the memory or storage device 200 or leaving the quantized version of the data block within the memory or storage device 200 untouched (e.g. if the "new" data block is to be stored at the same address as the "old" data block).

For this to work, the method may comprise checking, whether the quantized version of the data block is previously stored within the memory or storage device 200. As shown in FIG. 1b, the method may comprise determining 132, whether the quantized version of the data block is previously stored within the memory or storage device 200 based on the hash value. For example, the hash value may be used as an identifier or key to look up the quantized version of the data block within a data structure, e.g. within a hash table. This may enable the deduplication of the quantized value of the data block. For example, the memory or storage device 200 or the memory controller 100 may comprise a hash table. The hash table may comprise a plurality of data records. The plurality of data records may each comprise a quantized version of a data block and a corresponding hash value of the quantized version of the data block. The quantized version of the data block may be stored within a data record within the memory or storage device 200. The data record may be stored within a physical memory or storage block of the memory or storage device 200. In at least some examples, the data record may further comprise a reference count of the data record. The determining 132, whether the quantized version of the data block is previously stored within the memory or storage device 200, may comprise identifying whether the quantized version of the data block is comprised within a data record within the plurality of data records based on the hash value of the data block, e.g. based on the hash value of the quantized version of the data block. For example, determining 132, whether the quantized version of the data block is previously stored within the memory or storage device 200, may comprise locating the data record comprising the quantized version of the data block based on the hash value. For example, a hardware hash table or the like may be implemented in an Application Specific Integrated Circuit (ASIC), where a dedicated circuit may be used to implement the hash function. In other words, the determining 120 of the hash value may be implemented in hardware. As another example, the hash table can be stored in hardware, using dedicated registers that are addressed by the hash values or identifier values. Any other appropriate hardware-based table implementation can be used.

For example, as shown in FIG. 1b, the method may comprise receiving/obtaining 110 the data block within a write command, e.g. from a processor of the computer system. The quantized version of the data block may be stored upon reception of the data block. For example, the storing 130 of the quantized version of the data block may comprise writing 134 a data record with the quantized version of the data block to the memory or storage device 200 (only) if the quantized version of the data block is not previously stored within a data record within the memory or storage device 200, e.g. by adding the data record to the plurality of data records. This may enable adding the quantized version of the data block only to the memory or storage device if it is not previously stored within the memory or storage device, which may conserve storage space. In other words, the storing of the data block may avoid writing a new data record within the memory or storage device 200 if the quantized version of the data block is previously stored within a data record within the memory or storage device 200.

A different situation may arise if the quantized version of the data block is previously stored within the memory or storage device. For example, as further shown in FIG. 1b, the storing of the quantized version of the data block may comprise updating 136 a data record associated with the quantized version of the data block within the memory or storage device 200 if the quantized version of the data block is previously stored within the data record within the memory or storage device 200. Thus, if the quantized version of the data block is previously stored within the memory or storage device, no additional data record might be required for storing the quantized version of the data block, but the existing data record may be updated. For example, the updating of the data record may comprise changing a reference count within the data record. For example, the quantized version of the data block may be stored within a data record with a reference count for the quantized version of the data block. The storing 130 of the quantized version of the data block may comprise updating 138 the reference count of the data record associated with the quantized version of the data block if the quantized version of the data block is previously stored within the data record within the memory or storage device 200. The reference counter may enable tracking whether the data record is still required. Once the reference count reaches zero, e.g. as the originally stored quantized value related to a memory address that is overwritten, the data record may be purged.

Once the quantized version of the data block is stored 130 within the memory or storage device, a memory address may be required for accessing the stored quantized version of the data block. In the following, the term "memory address" may correspond to a physical memory address of the computer system 1000. A further shown in FIG. 1b, the method may comprise providing 140 a memory address for accessing the stored quantized version of the data block. This may enable access to the stored quantized value of the data block after storing of the quantized version of the data block. The method may comprise storing the memory address within a data structure, e.g. within a translation table. The data structure or translation table may comprise a plurality of entries. Each entry of the data structure or translation table may comprise a memory address and a hash value of the quantized version of the data block to be accessed using the memory address. For example, each entry may be associated with one (e.g. exactly one) data record stored within the memory or storage module. Each data record stored within the memory or storage module may be associated with one or more entries within the data structure or translation table. For example, more than one data entry of the plurality of entries may be associated with the same data record within the memory or storage module.

In at least some examples, the method comprises providing 150 transparent memory access to the stored quantized version of the data block based on the memory address for accessing the stored quantized version of the data block. In other words, the method may comprise providing read and/or write access to the stored quantized version of the data block for one or more further devices (e.g. for a processor) of the computer system based on the memory address. For example, the method may abstract the access to the stored quantized version for the one or more further devices of the computer system. If a read command related to the memory address is received, the stored quantized version of the data block may be returned. If a write command related to the memory address is received, the entry within the data structure/translation table and the data records stored within the memory or storage device 200 may be changed if an update is necessary.

For example, the memory address may be used to read the quantized version of the data block. As further shown in FIG. 1b, the method may further comprise receiving 160 a read command comprising the memory address. The method may comprise providing 162 the quantized version of the data block within a response to the read command. For example, the providing of the quantized version of the data block may comprise determining the hash value stored within an entry within the data structure/translation table based on the memory address of the entry, locating a data record comprising the quantized version of the data block within the memory or storage device based on the hash value, obtaining the quantized version of the data block from the data record and providing the quantized version of the data block, e.g. to a further device of the computer system 1000.

In a deduplicated memory system, multiple memory addresses may point to the same quantized version of the data block. This may lead to a more complex handling of write commands. In at least some examples, the stored quantized version of the data block is associated with one or more memory addresses for accessing the quantized version of the data block. The method may comprise receiving 170 a write command for a memory address associated with the stored quantized version of the data block. The write command may comprise an updated data block. For example, the write command may specify the updated data block to be stored at the memory address. The method may comprise determining 172 an updated hash value of the updated data block. The determining 172 of the updated hash value may be implemented similar to the determining of the hash value. The updated hash value may be based on the user-defined approximative hashing function. The method may further comprise determining a quantized version of the updated data block based on the user-defined approximative hashing function, e.g. based on the quantization component of the user-defined approximative hashing function. The method may comprise storing 174 the quantized version of the updated data block based on the updated hash value using the memory or storage device 200 of the computer system 1000 (only) if the updated hash value differs from the hash value. If the updated hash value is the same as the (previous) hash value, no changes might be made. The method may comprise adjusting the entry within the data structure/translation table based on the updated hash value. The method may further comprising adding a new data record with the quantized version of the updated data block or updating a previously stored data record comprising the quantized version of the data block (e.g. by increasing the reference count of the previously stored data record) based on the updated hash value. The method may comprise reducing 176 the reference count for the quantized version of the data block if the updated hash value differs from the hash value. This may enable tracking whether the stored quantized version of the data block is still relevant.

In at least some examples, the memory or storage device may comprise computer-readable memory, e.g. one or more memory chips. For example, the memory or storage device 200 may be a volatile memory device. For example, the memory or storage device 200 may comprise random access memory (RAM), dynamic RAM (DRAM), static RAM (SRAM), nonvolatile memory, persistent memory or any semiconductor memory, and it may be arranged in any architecture using any technology, e.g. phase change memory (PCM), dynamic random access memory (DRAM), flash memory, or DDR (double data rate memory). Alternatively or additionally, the memory or storage device may comprise computer-readable storage, e.g. flash-based storage or hard-disk storage. The memory or storage device 200 may be a persistent storage device. The persistent storage device may comprise at least one of flash-based storage, hard-disk storage and storage provided by persistent memory. For example, the plurality of data records may be stored persistently within the memory or storage device 200. The persistent memory may be based on Intel® 3D XPoint™. Intel and 3D XPoint are trademarks of Intel Corporation or its subsidiaries in the U.S. and/or other countries.

For example, the memory or storage controller 100 may be a memory controller, e.g. the memory controller of the computer system 1000. The memory controller may be a digital circuit that manages the flow of data going to and from the computer system's main memory. In some examples, the memory controller may be an integrated memory controller of a processor of the computer system 1000.

Alternatively, the memory or storage controller 100 may be storage controller, e.g. the storage controller of the computer system 1000. For example, the storage controller may be a storage controller for controlling persistent storage of the computer system 1000. In some examples, the storage controller may be a host controller of the computer system 1000.

In at least some examples, the computer system 1000 is a server computer system, e.g. a server operating within a data center. In some examples, the computer system 1000 may be an edge computing server, e.g. a server located at a base station of the mobile communication system. In some examples, the computer system 1000 may be a data collection computer system, e.g. a computer system configured to aggregate data from a plurality of data sources (e.g. from a plurality of sensor nodes or Internet of Things (IoT) devices).

The interface circuitry 12 or means for communicating 12 may correspond to one or more inputs and/or outputs for receiving and/or transmitting information, which may be in digital (bit) values according to a specified code, within a module, between modules or between modules of different entities. In embodiments the processing circuitry 14 or means for processing may be implemented using one or more processing units, one or more processing devices, any means for processing, such as a processor, a computer or a programmable hardware component being operable with accordingly adapted software. In other words, the described function of the processing circuitry may as well be implemented in software, which is then executed on one or more programmable hardware components. Such hardware components may comprise a general purpose processor, a Digital Signal Processor (DSP), a micro-controller, etc.

More details and aspects of the approximative memory deduplication method, the controller apparatus/controller device, the memory or storage controller or the computer system are mentioned in connection with the proposed concept or one or more examples described above or below (e.g. FIGS. 2a to 4). The approximative memory deduplication method, the controller apparatus/controller device, the memory or storage controller or the computer system may comprise one or more additional optional features corresponding to one or more aspects of the proposed concept or one or more examples described above or below.

At least some examples relate to approximate deduplication in storage and memory. Many actors, specifically in cloud environments, have identified memory and storage space as emerging as a primary optimization target in their environments.

Memory (and storage) deduplication is one approach: the key idea is compaction, or saving space by identifying multiple blocks or units with common content, and storing the common content once, with a list of the block/unit ids that contain it. This may be done and managed by hardware. Memory deduplication may reduce or minimize the existence of identical memory chunks in main memory space.

FIG. 2a shows a schematic diagram of two exemplary columns of memory, conventional system memory 212 and deduplicated system memory 216. In conventional system memory 212, duplicated values are stored at different addresses 214. In deduplicated system memory 216, each value is stored once (saving space) and associated with a reference count 218.

In at least some examples, memory deduplication may be implemented by the memory controller in hardware, e.g. in a manner that is transparent to the operating system and application software.

Figure 2B:
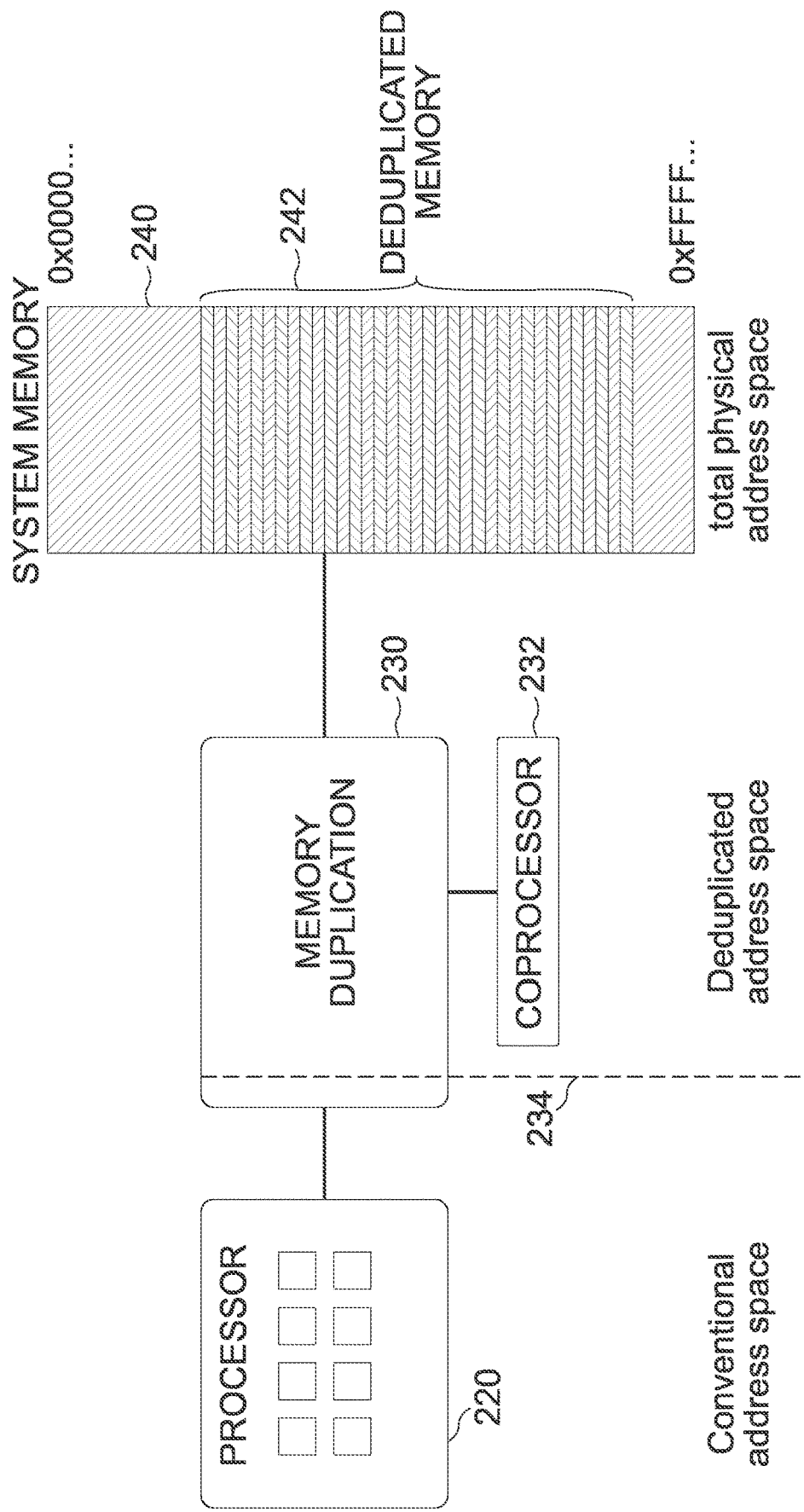
FIG. 2b shows a schematic diagram of a hardware-based deduplication scheme.

FIG. 2b shows a schematic diagram of a hardware-based deduplication scheme. Processor 220 communicates with memory controller 230, which is configured to provide memory deduplication. FIG. 2b shows divide 234, which illustrates that the processor 220 operates within "conventional" address space and that memory controller 230 operates in both "conventional" address space and deduplicated address space. The memory controller 232 is coupled with a coprocessor 232. The memory controller 230 provides access to system memory 230, which comprises deduplicated memory 242 stored within at least a subset of the total physical address space 240.

In many emerging domains, there is data that is similar but not identical in content. For example, there may be several redundant temperature sensors in a region that may report temperatures of 75 F, 75.1 F, 74.9 F, etc. or $CO_2$ sensors that provide very similar readings, etc. With thousands of such sensors or even tens of thousands of such sensors, systems may become flooded with data, where the differences in readings mean nothing or little to the user. If deduplication could be applied, the system might save a lot of space, with little to no impact to entropy from a user standpoint. In particular, the user may specify a tolerance bound for a given data type or domain—and all the values in the domain may be represented by a quantized version of the value, the average, as an example—resulting in significant compaction gains in memory and storage systems. At least some deduplication systems might be unable to allow for "approximate deduplication". At least some examples relate to providing approximate deduplication.

Many emerging domains such as edge computing, approximate computing, etc. involve massive volumes of data from sensors, etc. —and this data might quickly overwhelm memory and storage subsystems. At least some examples may enable significant additional compaction, and space savings on top of deduplication, and thus provide additional value to a user of such a system, as space is emerging as a first class design constraint in memory and storage systems.

At least some examples may provide the following:
(1) Means for a user to specify a function and level of precision (example, A-B<1% or 5%)
(2) Logic in the hardware to implement the function (as opposed to an exact match lookup done by deduplication)
(3) Compact and save space significantly by "approximate deduplication"

Figure 2C:
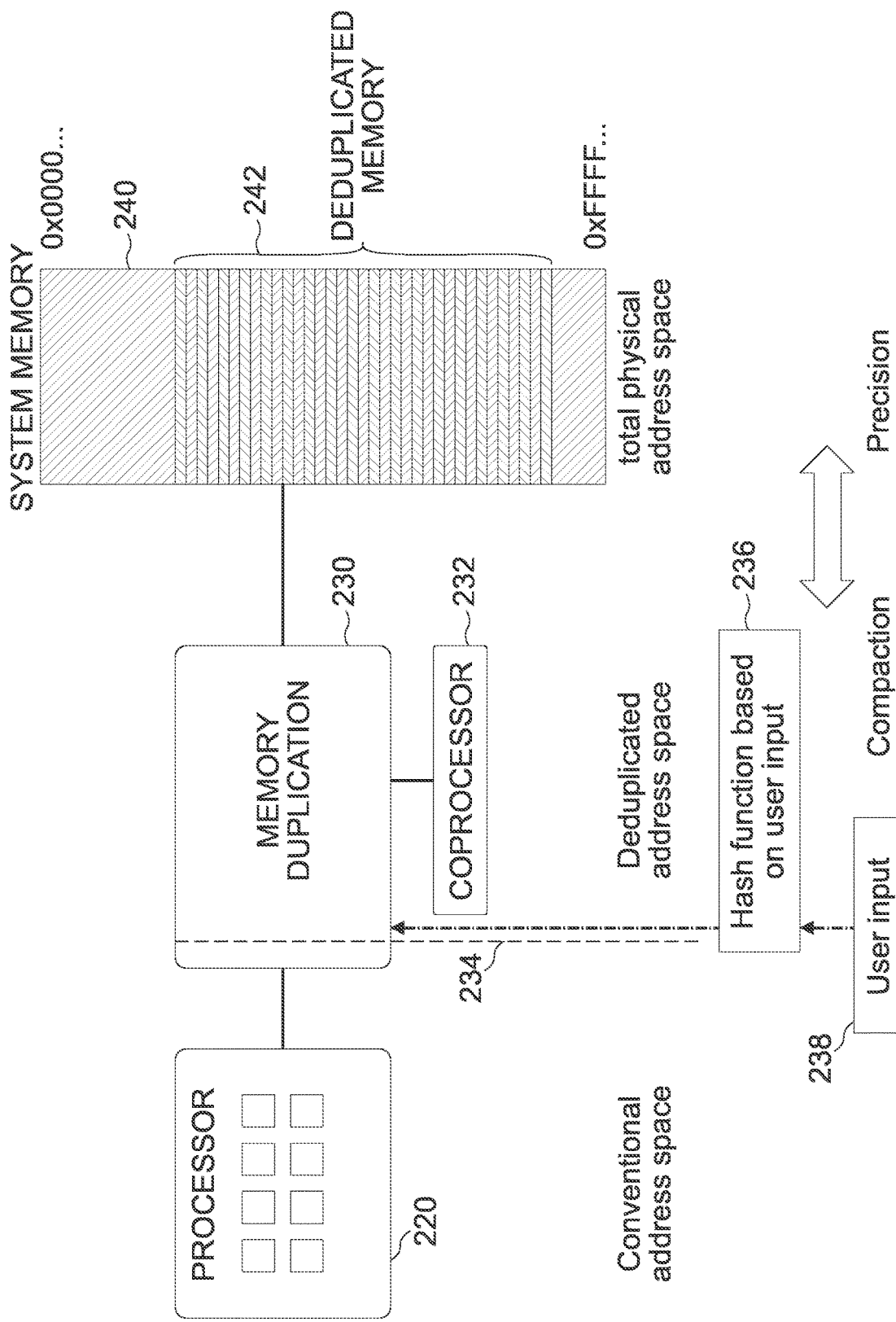
FIG. 2c shows a schematic diagram of a hardware-based approximative deduplication scheme.

The first component in at least some examples is the generation of a hash function, e.g. the user-defined approximative hash function, for content deduplication. This function may be generated based on the user input, which is really a means of telling the hardware the threshold/condition to consider two lines "identical" (as opposed to conventional deduplication when two lines have to be exactly identical). FIG. 2c shows a schematic diagram of a hardware-based deduplication scheme, which is similar to the hardware-based deduplication scheme of FIG. 2b, wherein a (approximative) hash function 236 is used for identifying content deduplication, and this is generated based on user input 238. There may be a tradeoff between compaction and precision.

The flows for read and write operations may be similar to conventional deduplication—the key difference may be usage of the hash function to check for a redundant write where the new value is within the range of approximation as specified by the user.

Figure 3A:
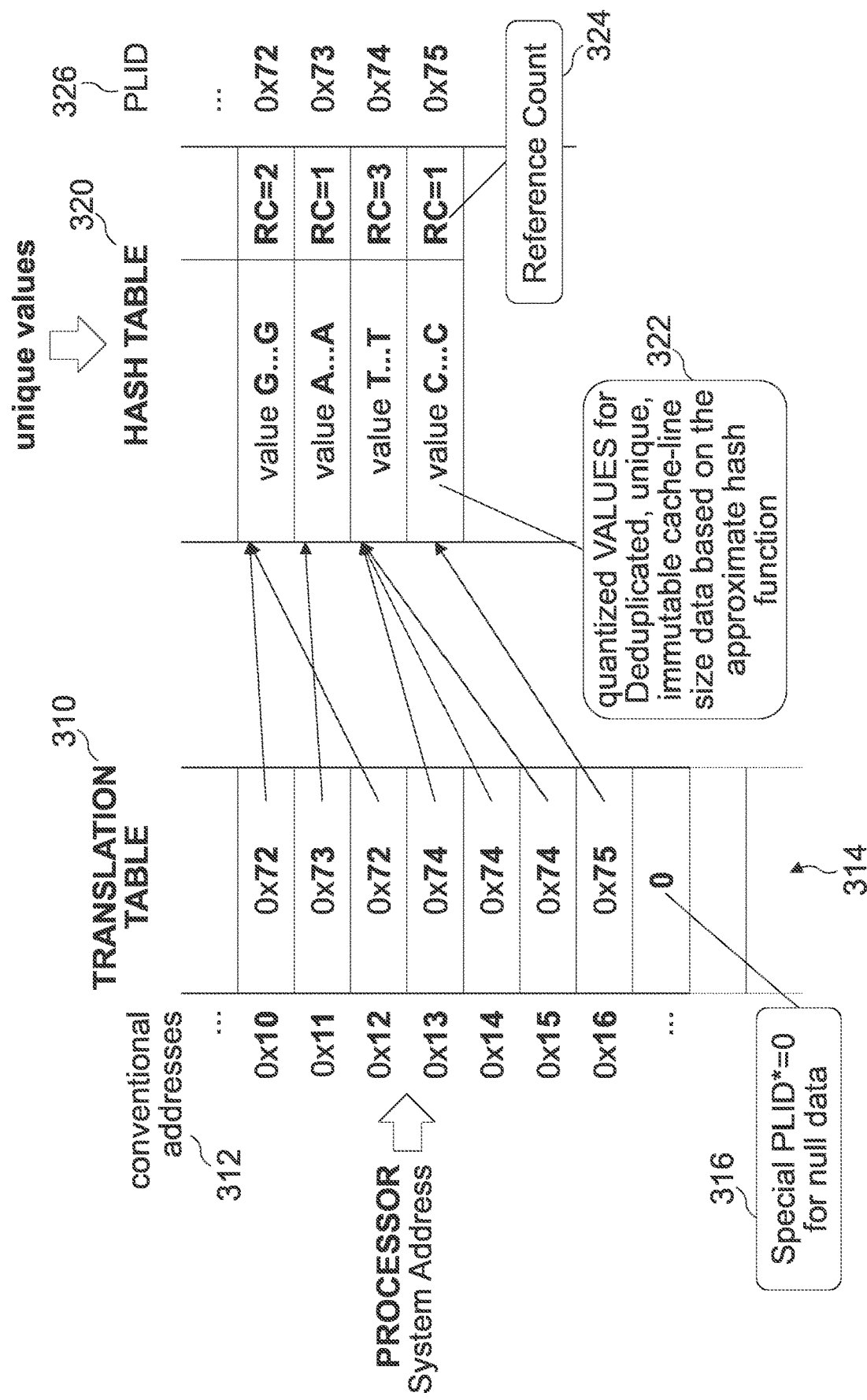
FIG. 3a shows basic structures of an approximative deduplication scheme.

FIG. 3a shows basic structures of such an approximative deduplication scheme. FIG. 3a shows translation table 310 comprising a mapping/translation between "conventional" addresses 312 and PLIDs (Physical Line Identifiers, e.g. the hash values) 314 (e.g. with a special PLID*=0 for null data). FIG. 3a further shows a hash table 320 with quantized values 322 (e.g. the quantized version of the data block), reference counts 324 and PLIDs 326 corresponding to the PLIDs 314 of the translation table 310. The hash table stores data values that are identical based on the approximation hash function (lines). It may provide a level of indirection to allow sharing data. For example, the quantized values may be which may be average or bucketed values for the range of input values. The quantized values may be deduplicated and unique. They may be immutable cache lines. The size of the quantized values may be based on the approximation hash function.

Figure 3B:
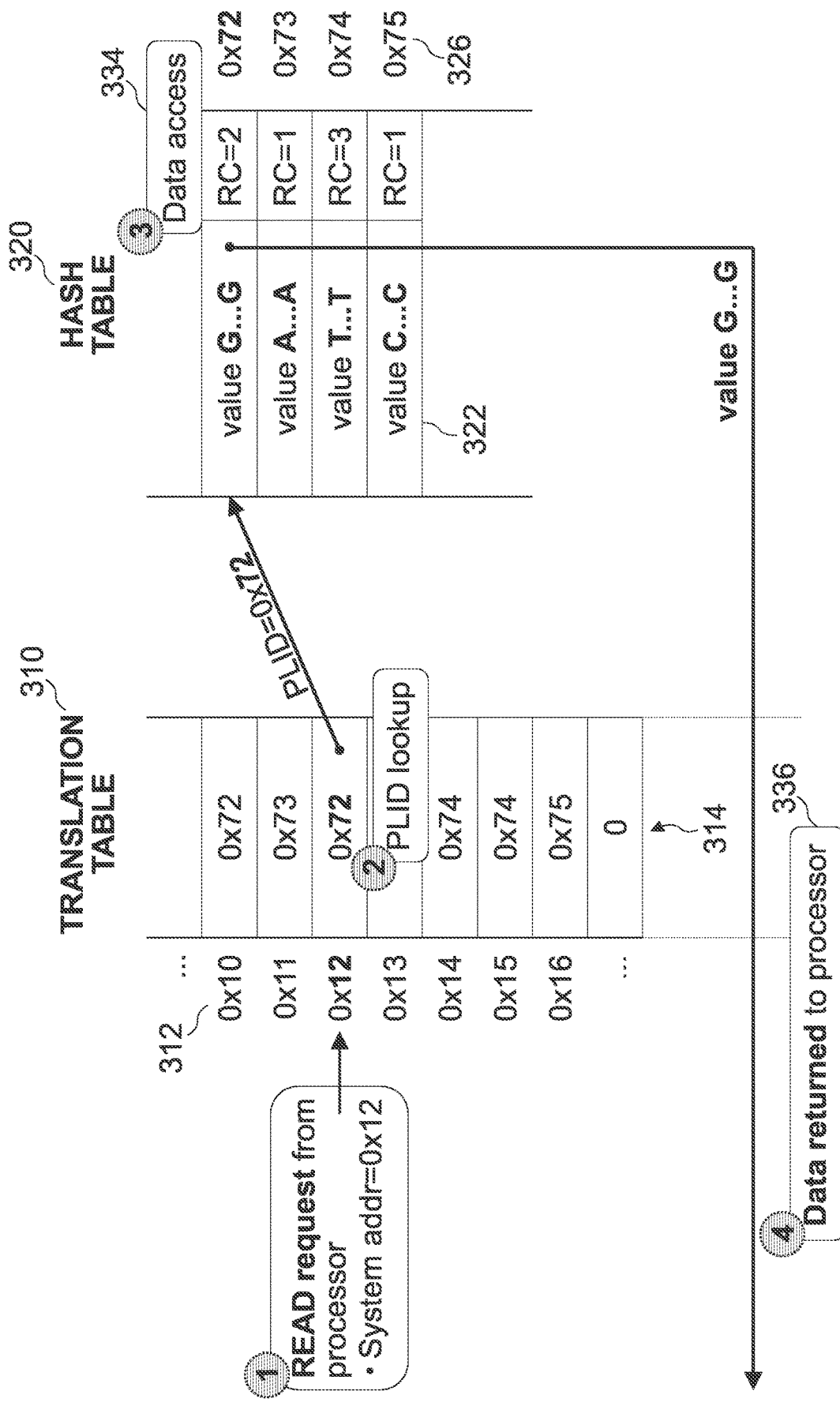
FIG. 3b illustrates an exemplary read operation

FIG. 3b illustrates an exemplary read operation based on the data structures introduced in connection with FIG. 3a. In a first sub-operation, the read operation comprises a read request 330 from processor for system address 0x12. In a second sub-operation, a PLID lookup 332 is performed in the translation table. Subsequently, the data (e.g. the quantized version) is accessed 334 based on the PLID, and the data is returned 336 to the processor.

Figure 3C:
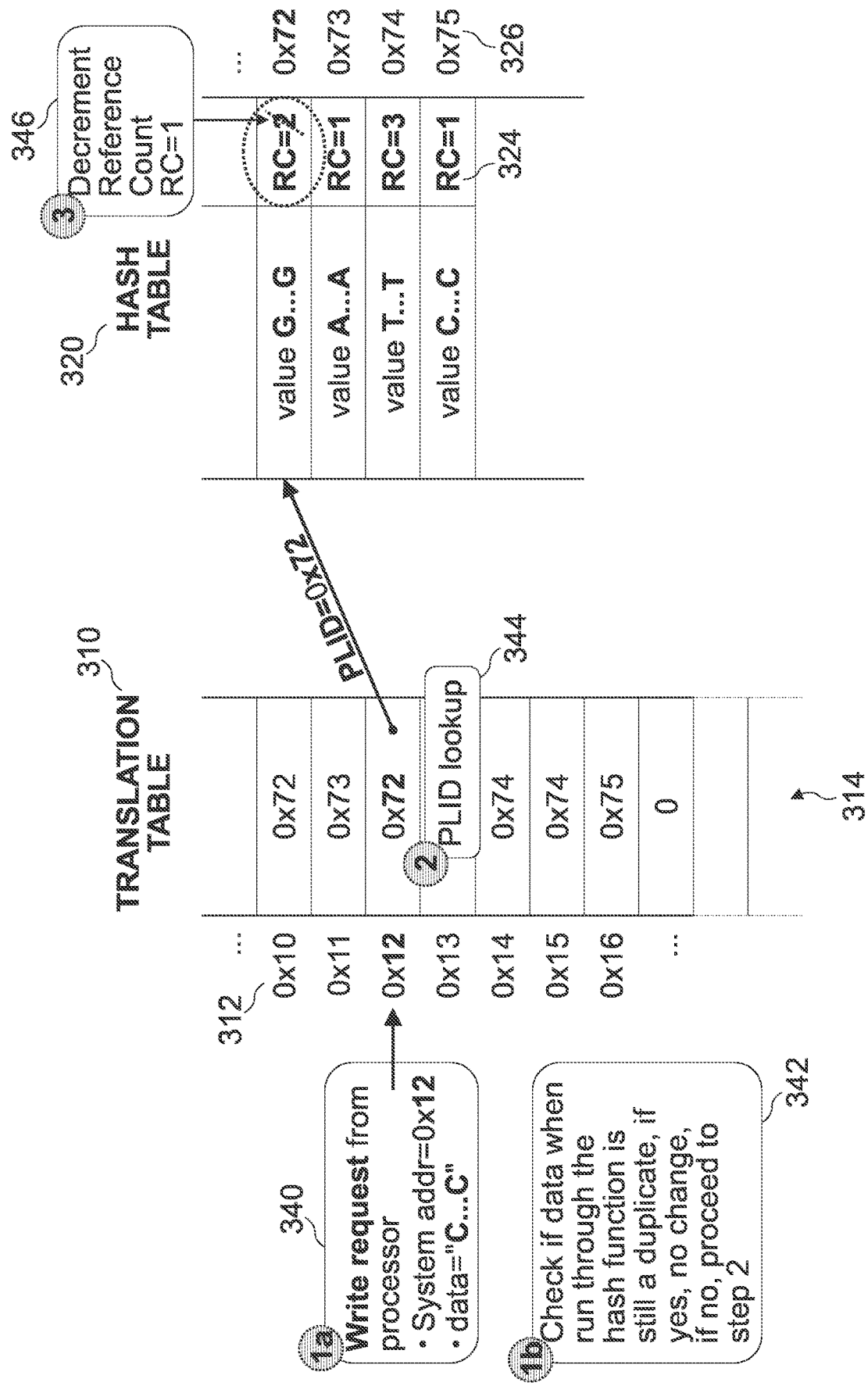
FIGS. 3c and 3d illustrate an exemplary write operation.
Figure 3D:
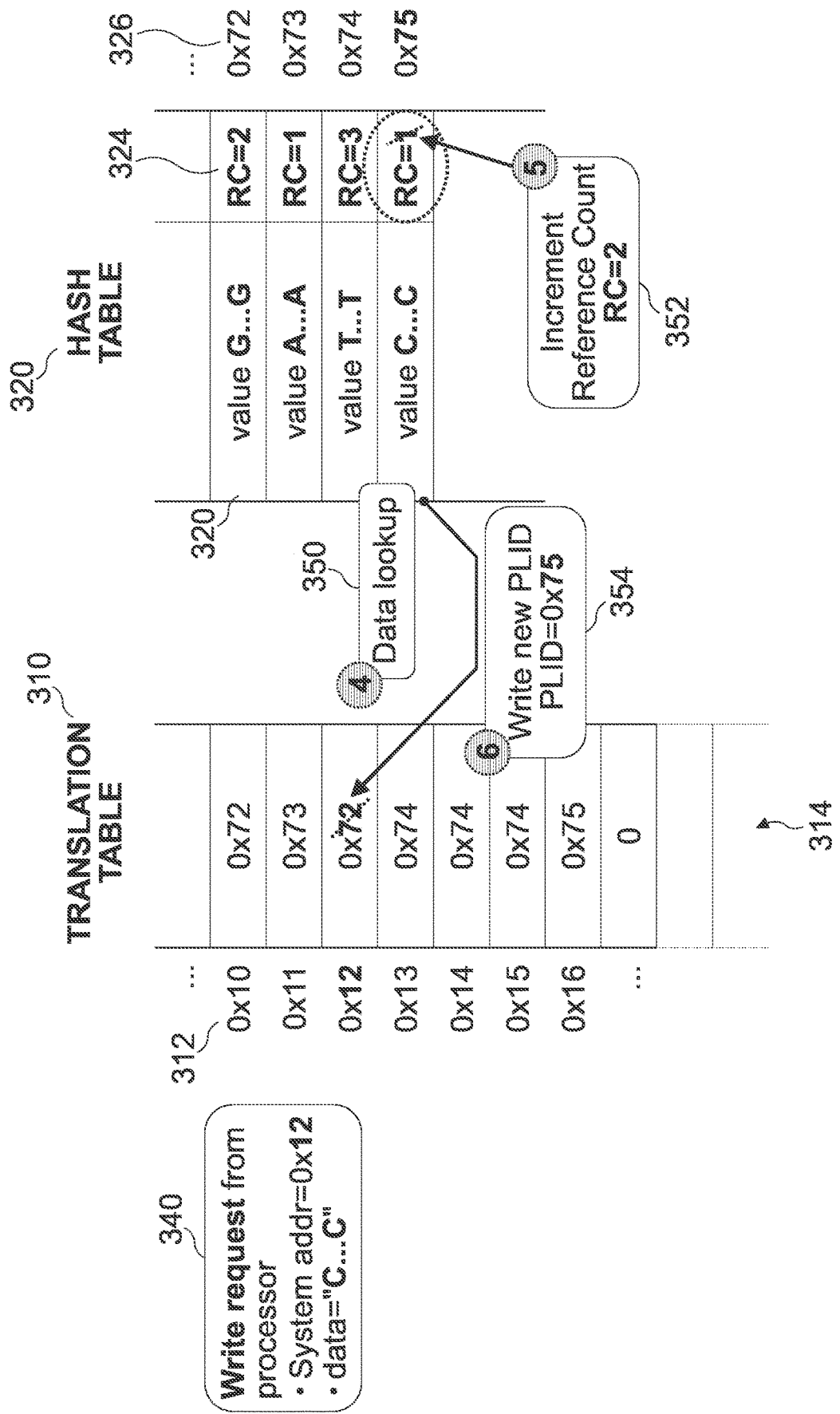

FIGS. 3c and 3d illustrate an exemplary write operation based on the data structures introduced in connection with FIG. 3a. FIG. 3c shows the "old value phase" of the write operation. In sub-operation 1a, a write request is received 340 from a processor for system address 0x12, with data "C . . . C". In sub-operation 1b, it us checked 342 if data when run through the hash function is still a duplicate—if yes, no change is made, if no, sub-operation 2 344 is executed. In sub-operation 2, a PLID lookup 344 is performed, and in sub-operation 3, the reference count is decremented, e.g. to RC=1 in the example. Continuing in FIG. 3d, the "new value phase" is shown. In sub-operation 4, a data lookup 350 is performed based on the data of the write request (e.g. based on the user-defined approximative hash function). The reference count of the corresponding line in the hash table is incremented, e.g. from RC=1 to RC=2 in the example. In sub-operation 6, the new PLID=0x75 is written 354 into the translation table at address 0x12.

More details and aspects of the approximative memory deduplication scheme are mentioned in connection with the proposed concept or one or more examples described above or below (e.g. FIGS. 2a to 3d). The approximative memory deduplication scheme may comprise one or more additional optional features corresponding to one or more aspects of the proposed concept or one or more examples described above or below.

Figure 4:
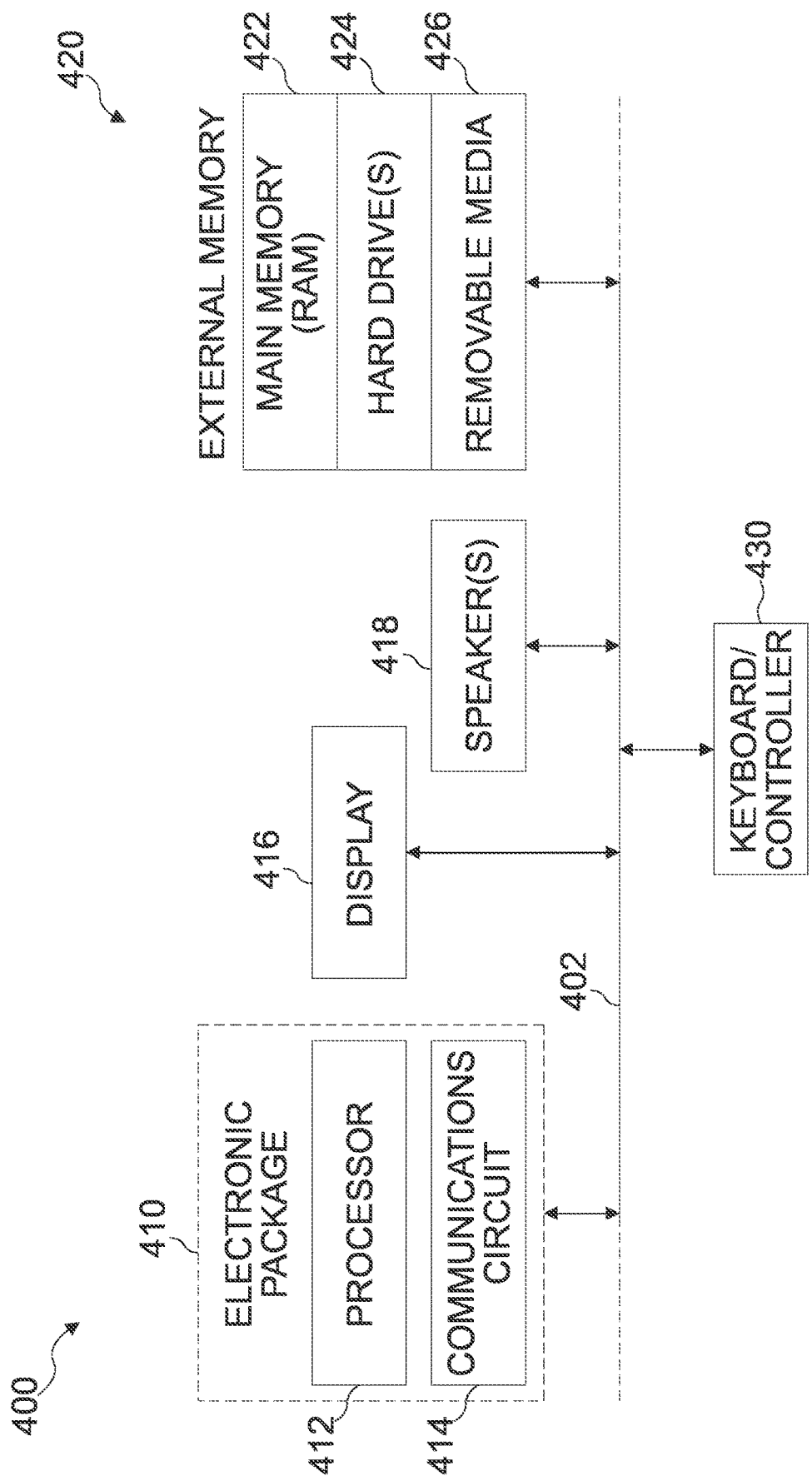
FIG. 4 is a block diagram of an electronic apparatus or computer system incorporating at least one controller apparatus, controller device, memory or storage controller or approximative memory deduplication method described herein.

FIG. 4 is a block diagram of an electronic apparatus or computer system incorporating at least one controller apparatus 10, controller device 10, memory or storage controller 100, or approximative memory deduplication method described herein. Electronic apparatus 400 is merely one example of an electronic apparatus in which forms of the controller apparatus 10, controller device 10, memory or storage controller 100, or approximative memory deduplication method described herein may be used. Examples of an electronic apparatus 400 include, but are not limited to, personal computers, tablet computers, mobile telephones, game devices, MP3 or other digital music players, etc. In this example, electronic apparatus 400 comprises a data processing system that includes a system bus 402 to couple the various components of the electronic apparatus 400. System bus 402 provides communications links among the various components of the electronic apparatus 400 and may be implemented as a single bus, as a combination of busses, or in any other suitable manner.

An electronic assembly 410 as describe herein may be coupled to system bus 402. The electronic assembly 410 may include any circuit or combination of circuits. In one embodiment, the electronic assembly 410 includes a processor 412 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that may be included in electronic assembly 410 are a custom circuit, an application-specific integrated circuit (ASIC), or the like, such as, for example, one or more circuits (such as a communications circuit 414) for use in wireless devices like mobile telephones, tablet computers, laptop computers, two-way radios, and similar electronic systems. The IC can perform any other type of function.

The electronic apparatus 400 may also include an external memory 420, which in turn may include one or more memory elements suitable to the particular application, such as a main memory 422 in the form of random access memory (RAM), one or more hard drives 424, and/or one or more drives that handle removable media 426 such as compact disks (CD), flash memory cards, digital video disk (DVD), and the like.

The electronic apparatus 400 may also include a display device 416, one or more speakers 418, and a keyboard and/or controller 430, which can include a mouse, trackball, touch screen, voice-recognition device, or any other device that permits a system user to input information into and receive information from the electronic apparatus 400.

The aspects and features mentioned and described together with one or more of the previously detailed examples and figures, may as well be combined with one or more of the other examples in order to replace a like feature of the other example or in order to additionally introduce the feature to the other example.

Example 1 relates to an approximative memory deduplication method for a computer system 1000. The method includes Determining 120 a hash value of a data block, wherein the hash value is based on a user-defined approximative hashing function. The method includes Storing 130 a quantized version of the data block based on the hash value using a memory or storage device 200 of the computer system 1000.

In Example 2, the subject matter of example 1 or any of the Examples described herein may further include, that the user-defined approximative hashing function defines a user-desired precision for the quantized version of the data block.

In Example 3, the subject matter of one of the examples 1 to 2 or any of the Examples described herein may further include, that the user-defined approximative hashing function is a hashing function that determines the hash value of the data block based on the quantized version of the data block.

In Example 4, the subject matter of one of the examples 1 to 3 or any of the Examples described herein may further include, that the user-defined approximative hashing function is specific to a content type of the data block.

In Example 5, the subject matter of one of the examples 1 to 4 or any of the Examples described herein may further include, that the user-defined approximative hashing function is suitable for assigning the data block to a bucket of a plurality of possible buckets.

In Example 6, the subject matter of one of the examples 1 to 5 or any of the Examples described herein may further include, that the user-defined approximative hashing function is suitable for data quantization of content of the data block.

In Example 7, the subject matter of one of the examples 1 to 6 or any of the Examples described herein may further include, that the quantized version of the data block has a lower precision or lower resolution than the data block.

In Example 8, the subject matter of one of the examples 1 to 7 or any of the Examples described herein may further include, that the method includes receiving 110 the data block within a write command, wherein the quantized version of the data block is stored upon reception of the data block.

In Example 9, the subject matter of example 8 or any of the Examples described herein may further include, that the data block is discarded after storing of the quantized version of the data block.

In Example 10, the subject matter of one of the examples 1 to 9 or any of the Examples described herein may further include, that the method further includes providing 140 a memory address for accessing the stored quantized version of the data block.

In Example 11, the subject matter of example 10 or any of the Examples described herein may further include, that the method includes providing 150 transparent memory access to the stored quantized version of the data block based on the memory address for accessing the stored quantized version of the data block.

In Example 12, the subject matter of one of the examples 10 to 11 or any of the Examples described herein may further include, that the method further includes receiving 160 a read command including the memory address, wherein the method includes providing 162 the quantized version of the data block within a response to the read command.

In Example 13, the subject matter of one of the examples 1 to 12 or any of the Examples described herein may further include, that the quantized version of the data block is stored within a data record within the memory or storage device 200.

In Example 14, the subject matter of example 13 or any of the Examples described herein may further include, that the data record is stored within a physical memory or storage block of the memory or storage device 200.

In Example 15, the subject matter of one of the examples 1 to 14 or any of the Examples described herein may further include, that the method includes determining 132, whether the quantized version of the data block is previously stored within the memory or storage device 200 based on the hash value.

In Example 16, the subject matter of example 15 or any of the Examples described herein may further include, that the storing 130 of the quantized version of the data block includes writing 134 a data record with the quantized version of the data block to the memory or storage device 200 if the quantized version of the data block is not previously stored within a data record within the memory or storage device 200.

In Example 17, the subject matter of one of the examples 15 to 16 or any of the Examples described herein may further include, that the storing of the data block avoids writing a new data record within the memory or storage device 200 if the quantized version of the data block is previously stored within a data record within the memory or storage device 200

In Example 18, the subject matter of one of the examples 15 to 17 or any of the Examples described herein may further include, that the storing of the quantized version of the data block includes updating 136 a data record associated with the quantized version of the data block within the memory or storage device 200 if the quantized version of the data block is previously stored within the data record within the memory or storage device 200.

In Example 19, the subject matter of example 18 or any of the Examples described herein may further include, that the quantized version of the data block is stored within a data record with a reference count for the quantized version of the data block, wherein the storing 130 of the quantized version of the data block includes updating 138 the reference count of the data record associated with the quantized version of the data block if the quantized version of the data block is previously stored within the data record within the memory or storage device 200.

In Example 20, the subject matter of one of the examples 1 to 19 or any of the Examples described herein may further include, that the stored quantized version of the data block is associated with one or more memory addresses for accessing the quantized version of the data block, wherein the method includes receiving 170 a write command for a memory address associated with the stored quantized version of the data block, wherein the write command includes an updated data block, wherein the method includes determining 172 an updated hash value of the updated data block, wherein the updated hash value is based on the user-defined approximative hashing function, wherein the method includes storing 174 a quantized version of the updated data block based on the updated hash value using the memory or storage device 200 of the computer system 1000 if the updated hash value differs from the hash value.

In Example 21, the subject matter of example 20 or any of the Examples described herein may further include, that the method includes reducing 176 a reference count for the quantized version of the data block if the updated hash value differs from the hash value.

In Example 22, the subject matter of one of the examples 1 to 21 or any of the Examples described herein may further include, that the memory or storage device 200 is a volatile memory device.

In Example 23, the subject matter of one of the examples 1 to 21 or any of the Examples described herein may further include, that the memory or storage device 200 is a persistent storage device.

In Example 24, the subject matter of one of the examples 1 to 23 or any of the Examples described herein may further include, that the approximative memory deduplication method is executed by a memory or storage controller 100 of the computer system 1000.

In Example 25, the subject matter of one of the examples 1 to 24 or any of the Examples described herein may further include, that the data block includes numerical data and/or sensor data.

In Example 26, the subject matter of one of the examples 1 to 24 or any of the Examples described herein may further include, that the data block includes non-numerical content, wherein the user-defined approximative hashing function is suitable for assigning the data block to a bucket of a plurality of possible buckets based on the non-numerical content.

Example 27 relates to a controller apparatus 10 for a memory or storage controller 100 of a computer system 1000. The controller apparatus 10 includes interface circuitry 12 for communicating with a memory or storage device 200 of the computer system 1000. The controller apparatus 10 includes processing circuitry 14 configured to determine a hash value of a data block, wherein the hash value is based on a user-defined approximative hashing function. The processing circuitry is configured to store a quantized version of the data block using the memory or storage device 200 based on the hash value.

In Example 28, the subject matter of example 27 or any of the Examples described herein may further include, that the user-defined approximative hashing function defines a user-desired precision for the quantized version of the data block.

In Example 29, the subject matter of one of the examples 27 to 28 or any of the Examples described herein may further include, that the user-defined approximative hashing function is a hashing function that determines the hash value of the data block based on the quantized version of the data block.

In Example 30, the subject matter of one of the examples 27 to 29 or any of the Examples described herein may further include, that the user-defined approximative hashing function is specific to a content type of the data block.

In Example 31, the subject matter of one of the examples 27 to 30 or any of the Examples described herein may further include, that the user-defined approximative hashing function is suitable for assigning the data block to a bucket of a plurality of possible buckets.

In Example 32, the subject matter of one of the examples 27 to 31 or any of the Examples described herein may further include, that the user-defined approximative hashing function is suitable for data quantization of content of the data block.

In Example 33, the subject matter of one of the examples 27 to 32 or any of the Examples described herein may further include, that the quantized version of the data block has a lower precision or lower resolution than the data block.

In Example 34, the subject matter of one of the examples 27 to 33 or any of the Examples described herein may further include, that the processing circuitry 14 is configured to receive the data block within a write command via the interface circuitry 12, wherein the quantized version of the data block is stored upon reception of the data block.

In Example 35, the subject matter of example 34 or any of the Examples described herein may further include, that the data block is discarded after storing of the quantized version of the data block.

In Example 36, the subject matter of one of the examples 27 to 35 or any of the Examples described herein may further include, that the processing circuitry 14 is configured to provide a memory address for accessing the stored quantized version of the data block.

In Example 37, the subject matter of example 36 or any of the Examples described herein may further include, that the processing circuitry 14 is configured to provide transparent memory access to the stored quantized version of the data block based on the memory address for accessing the stored quantized version of the data block.

In Example 38, the subject matter of one of the examples 36 to 37 or any of the Examples described herein may further include, that the processing circuitry 14 is configured to receive a read command including the memory address, wherein the processing circuitry 14 is configured to provide the quantized version of the data block within a response to the read command.

In Example 39, the subject matter of one of the examples 27 to 38 or any of the Examples described herein may further include, that the quantized version of the data block is stored within a data record within the memory or storage device 200.

In Example 40, the subject matter of example 39 or any of the Examples described herein may further include, that the data record is stored within a physical memory or storage block of the memory or storage device 200.

In Example 41, the subject matter of one of the examples 27 to 40 or any of the Examples described herein may further include, that the processing circuitry 14 is configured to determine, whether the quantized version of the data block is previously stored within the memory or storage device 200 based on the hash value.

In Example 42, the subject matter of example 41 or any of the Examples described herein may further include, that the storing of the quantized version of the data block includes writing a data record with the quantized version of the data block to the memory or storage device 200 if the quantized version of the data block is not previously stored within a data record within the memory or storage device 200.

In Example 43, the subject matter of one of the examples 41 to 42 or any of the Examples described herein may further include, that the storing of the data block avoids writing a new data record within the memory or storage device 200 if the quantized version of the data block is previously stored within a data record within the memory or storage device 200

In Example 44, the subject matter of one of the examples 41 to 43 or any of the Examples described herein may further include, that the storing of the quantized version of the data block includes updating a data record associated with the quantized version of the data block within the memory or storage device 200 if the quantized version of the data block is previously stored within the data record within the memory or storage device 200.

In Example 45, the subject matter of example 44 or any of the Examples described herein may further include, that the quantized version of the data block is stored within a data record with a reference count for the quantized version of the data block, wherein the storing of the quantized version of the data block includes updating the reference count of the data record associated with the quantized version of the data block if the quantized version of the data block is previously stored within the data record within the memory or storage device 200.

In Example 46, the subject matter of one of the examples 27 to 45 or any of the Examples described herein may further include, that the stored quantized version of the data block is associated with one or more memory addresses for accessing the quantized version of the data block, wherein the processing circuitry 14 is configured to receive a write command for a memory address associated with the stored quantized version of the data block, wherein the write command includes an updated data block, wherein the processing circuitry 14 is configured to determine an updated hash value of the updated data block, wherein the updated hash value is based on the user-defined approximative hashing function, wherein the wherein the processing circuitry 14 is configured to store a quantized version of the updated data block based on the updated hash value using the memory or storage device 200 of the computer system 1000 if the updated hash value differs from the hash value.

In Example 47, the subject matter of example 46 or any of the Examples described herein may further include, that the wherein the processing circuitry 14 is configured to reduce a reference count for the quantized version of the data block if the updated hash value differs from the hash value.

In Example 48, the subject matter of one of the examples 27 to 47 or any of the Examples described herein may further include, that the memory or storage device 200 is a volatile memory device.

In Example 49, the subject matter of one of the examples 27 to 47 or any of the Examples described herein may further include, that the memory or storage device 200 is a persistent storage device.

In Example 50, the subject matter of one of the examples 27 to 49 or any of the Examples described herein may further include, that the controller apparatus 10 is part of a memory or storage controller 100 of the computer system 1000.

In Example 51, the subject matter of one of the examples 27 to 50 or any of the Examples described herein may further include, that the data block includes numerical data and/or sensor data.

In Example 52, the subject matter of one of the examples 27 to 50 or any of the Examples described herein may further include, that the data block includes non-numerical content, wherein the user-defined approximative hashing function is suitable for assigning the data block to a bucket of a plurality of possible buckets based on the non-numerical content.

Example 53 relates to a memory or storage controller 100 for a computer system 1000, the memory or storage controller 100 including the controller apparatus 10 according to one of the examples 27 to 52.

Example 54 relates to a computer system 1000 including the memory or storage controller 100 according to example 53 and a memory or storage device 200.

Example 55 relates to a controller device 10 for a memory or storage controller 100 of a computer system 1000. The controller device 10 includes means for communicating 12, suitable for communicating with a memory or storage device

200 of the computer system 1000. The controller device 10 includes means for processing 14 configured for determining a hash value of a data block, wherein the hash value is based on a user-defined approximative hashing function. The means for processing 14 is configured for storing a quantized version of the data block based on the hash value using the memory or storage device 200 of the computer system 1000.

In Example 56, the subject matter of example 55 or any of the Examples described herein may further include, that the user-defined approximative hashing function defines a user-desired precision for the quantized version of the data block.

In Example 57, the subject matter of one of the examples 55 to 56 or any of the Examples described herein may further include, that the user-defined approximative hashing function is a hashing function that determines the hash value of the data block based on the quantized version of the data block.

In Example 58, the subject matter of one of the examples 55 to 57 or any of the Examples described herein may further include, that the user-defined approximative hashing function is specific to a content type of the data block.

In Example 59, the subject matter of one of the examples 55 to 58 or any of the Examples described herein may further include, that the user-defined approximative hashing function is suitable for assigning the data block to a bucket of a plurality of possible buckets.

In Example 60, the subject matter of one of the examples 55 to 59 or any of the Examples described herein may further include, that the user-defined approximative hashing function is suitable for data quantization of content of the data block.

In Example 61, the subject matter of one of the examples 55 to 60 or any of the Examples described herein may further include, that the quantized version of the data block has a lower precision or lower resolution than the data block.

In Example 62, the subject matter of one of the examples 55 to 61 or any of the Examples described herein may further include, that the means for processing 14 is configured for receiving the data block within a write command, wherein the quantized version of the data block is stored upon reception of the data block.

In Example 63, the subject matter of example 62 or any of the Examples described herein may further include, that the data block is discarded after storing of the quantized version of the data block.

In Example 64, the subject matter of one of the examples 55 to 63 or any of the Examples described herein may further include, that the means for processing 14 is configured for providing a memory address for accessing the stored quantized version of the data block.

In Example 65, the subject matter of example 64 or any of the Examples described herein may further include, that the means for processing 14 is configured for providing transparent memory access to the stored quantized version of the data block based on the memory address for accessing the stored quantized version of the data block.

In Example 66, the subject matter of one of the examples 64 to 65 or any of the Examples described herein may further include, that the means for processing 14 is configured for receiving a read command including the memory address, wherein the means for processing 14 is configured for providing the quantized version of the data block within a response to the read command.

In Example 67, the subject matter of one of the examples 55 to 66 or any of the Examples described herein may further include, that the quantized version of the data block is stored within a data record within the memory or storage device 200.

In Example 68, the subject matter of example 67 or any of the Examples described herein may further include, that the data record is stored within a physical memory or storage block of the memory or storage device 200.

In Example 69, the subject matter of one of the examples 55 to 68 or any of the Examples described herein may further include, that the means for processing 14 is configured for determining, whether the quantized version of the data block is previously stored within the memory or storage device 200 based on the hash value.

In Example 70, the subject matter of example 69 or any of the Examples described herein may further include, that the storing of the quantized version of the data block includes writing a data record with the quantized version of the data block to the memory or storage device 200 if the quantized version of the data block is not previously stored within a data record within the memory or storage device 200.

In Example 71, the subject matter of one of the examples 69 to 70 or any of the Examples described herein may further include, that the storing of the data block avoids writing a new data record within the memory or storage device 200 if the quantized version of the data block is previously stored within a data record within the memory or storage device 200

In Example 72, the subject matter of one of the examples 69 to 71 or any of the Examples described herein may further include, that the storing of the quantized version of the data block includes updating a data record associated with the quantized version of the data block within the memory or storage device 200 if the quantized version of the data block is previously stored within the data record within the memory or storage device 200.

In Example 73, the subject matter of example 72 or any of the Examples described herein may further include, that the quantized version of the data block is stored within a data record with a reference count for the quantized version of the data block, wherein the storing of the quantized version of the data block includes updating the reference count of the data record associated with the quantized version of the data block if the quantized version of the data block is previously stored within the data record within the memory or storage device 200.

In Example 74, the subject matter of one of the examples 55 to 73 or any of the Examples described herein may further include, that the stored quantized version of the data block is associated with one or more memory addresses for accessing the quantized version of the data block, wherein the means for processing 14 is configured for receiving a write command for a memory address associated with the stored quantized version of the data block, wherein the write command includes an updated data block, wherein the means for processing 14 is configured for determining an updated hash value of the updated data block, wherein the updated hash value is based on the user-defined approximative hashing function, wherein the means for processing 14 is configured for storing a quantized version of the updated data block based on the updated hash value using the memory or storage device 200 of the computer system 1000 if the updated hash value differs from the hash value.

In Example 75, the subject matter of example 74 or any of the Examples described herein may further include, that the means for processing 14 is configured for reducing a reference count for the quantized version of the data block if the updated hash value differs from the hash value.

In Example 76, the subject matter of one of the examples 55 to 75 or any of the Examples described herein may further include, that the memory or storage device 200 is a volatile memory device.

In Example 77, the subject matter of one of the examples 55 to 75 or any of the Examples described herein may further include, that the memory or storage device 200 is a persistent storage device.

In Example 78, the subject matter of one of the examples 55 to 77 or any of the Examples described herein may further include, that the controller device 10 is part of a memory or storage controller 100 of the computer system 1000.

In Example 79, the subject matter of one of the examples 55 to 78 or any of the Examples described herein may further include, that the data block includes numerical data and/or sensor data.

In Example 80, the subject matter of one of the examples 55 to 79 or any of the Examples described herein may further include, that the data block includes non-numerical content, wherein the user-defined approximative hashing function is suitable for assigning the data block to a bucket of a plurality of possible buckets based on the non-numerical content.

Example 81 relates to a memory or storage controller 100 for a computer system 1000, the memory or storage controller 100 including the controller device 10 according to one of the examples 55 to 80.

Example 82 relates to a computer system 1000 including the memory or storage controller 100 according to Example 81 and a memory or storage device 200.

Example 83 relates to a machine readable storage medium including program code, when executed, to cause a machine to perform the method of one of the examples 1 to 26 or according to any other example.

Example 84 relates to a computer program having a program code for performing the method of at least one of the examples 1 to 26 or according to any other example, when the computer program is executed on a computer, a processor, or a programmable hardware component.

Example 85 relates to a machine readable storage including machine readable instructions, when executed, to implement a method or realize an apparatus as claimed in any pending claim or example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F) PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for a memory or storage controller of a computer system, wherein the apparatus comprises:
    interface circuitry for communicating with a memory or storage device of the computer system, and
    processing circuitry configured to:
        determine a hash value based on a user-defined approximative hashing function, wherein the user-defined approximative hashing function:
            quantizes content of a data block creating a quantized data block,
            hashes the quantized data block to produce the hash value, and
            based on the hash value, store the quantized data block using the memory or storage device.

2. The apparatus according to claim 1 wherein the user-defined approximative hashing function defines a user-desired precision for the quantized data block.

3. The apparatus according to claim 1, wherein the user-defined approximative hashing function is specific to a content type of the data block.

4. The apparatus according to claim 1 wherein the user-defined approximative hashing function is suitable for assigning the data block to a bucket of a plurality of possible buckets.

5. The apparatus according to claim 1, wherein the quantized data block has a lower precision or lower resolution than the data block.

6. The apparatus according to claim 1 wherein the processing circuitry is configured to receive the data block within a write command via the interface circuitry, wherein the quantized data block is stored upon reception of the data block, wherein the data block is discarded after storing of the quantized data block.

7. The apparatus according to claim 1, wherein the memory or storage device is a volatile memory device.

8. The apparatus according to claim 1, wherein the memory or storage device is a persistent storage device.

9. The apparatus according to claim 1, wherein the data block comprises numerical data and/or sensor data.

10. The apparatus according to claim 1, wherein the data block comprises non-numerical content, wherein the user-defined approximative hashing function is suitable for assigning the data block to a bucket of a plurality of possible buckets based on the non-numerical content.

11. The apparatus according to claim 1, wherein the processing circuitry is configured to provide a memory address for accessing the stored quantized data block.

12. The apparatus according to claim 11 wherein the processing circuitry is configured to provide transparent memory access to the stored quantized data block based on the memory address for accessing the stored quantized data block.

13. The apparatus according to claim 11 wherein the processing circuitry is configured to receive a read command comprising the memory address, wherein the processing circuitry is configured to provide the quantized data block within a response to the read command.

14. The apparatus according to claim 1, wherein the processing circuitry is configured to determine, whether the quantized data block is previously stored within the memory or storage device based on the hash value.

15. The apparatus according to claim 14, wherein the storing of the quantized data block avoids writing a new data record within the memory or storage device if the quantized data block is previously stored within a data record within the memory or storage device.

16. The apparatus according to claim 15, wherein the quantized data block is stored within a data record with a reference count for the quantized data block, wherein the storing oft the quantized data block comprises updating the reference count of the data record associated with the quantized data block if the quantized data block is previously stored within the data record within the memory or storage device.

17. A memory or storage controller for a computer system, the memory or storage controller comprising the apparatus according to claim 1.

18. A non-transitory, computer-readable storage medium including program code, when executed, to cause a machine to perform a method, the method comprising:
    determining a hash value based on a user-defined approximative hashing function, wherein the user-defined approximative hashing function:
        quantizes content of a data block creating a quantized data block,
        hashes the quantized data block to produce the hash value, and
        based on the hash value, storing the quantized data block using a memory or storage device of the machine.

* * * * *